Patented Dec. 26, 1944

2,366,034

UNITED STATES PATENT OFFICE 2,366,034

PROCESS FOR PRODUCTION OF AZO DYESTUFF

Nicholas J. Letang, Wilmington, Del., assignor to E. I. du Pont de Nemours & Company, Wilmington, Del., a corporation of Delaware No Drawing. Application May 21, 1943,
Serial No. 487,966

2 Claims. (Cl. 260—207)

This invention relates to a yellow azo dyestuff which is substantially insoluble in water, and to a process of preparing the dyestuff.

The objects of the invention are accomplished by making the dyestuff represented by the formula:

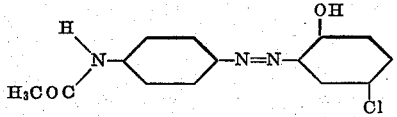

by a particular process. This color is a yellow dyestuff which is substantially insoluble in water, applicable to cellulose acetate and other cellulose esters, ethyl cellulose and cellulose ethers, and to nylon from aqueous soap dispersions, and which is fast to light and otherwise possessed of good dye properties.

In the experimentation which led to this invention this dyestuff was conceived and was made by coupling para-amino-acetanilide diazo to para-chloro-phenol, but the color was dull and off-shade, and the production was accompanied by decomposition, the products of which were found in the color. It was obtained in yields of only about 50% which removed it from the realm of commercial production.

It has now been discovered that the dyestuff, whose formula is above set forth, can be made in nearly quantitative yields by coupling para-nitro-aniline to para-chloro-phenol, reducing the product and acetylating it; and that, when so produced, it yields bright shades of yellow which are faster to light on acetate rayon than the dye para-amino-acetanilide→para-cresol.

The dyestuff is preferably prepared for the market by viscous milling with dextrin and a suitable wetting or dispersing agent of the types known to the art. It is preferably applied to artificial fibers, such as acetate rayon and nylon, from aqueous soap dispersions. It can be used as a self-shade and as the yellow component of brown and green blends made by mixing with red and blue dyes of the dispersed type. When applied to the fiber from an aqueous soap dispersion, it is readily absorbed at moderate temperatures, about 120–140° F., in periods of time from about 5 to 15 minutes. It transfers readily from dyed nylon to undyed nylon in a soap bath so that level dyeings are obtained. It dyes nylon of different draw ratios in comparable strengths, which is important in the dyeing of nylon hosiery.

The method of making the dye and the method of applying it will be better understood by a reference to the following examples, which are for purposes of illustration only and do not constitute a limitation.

Example I 138 parts of p-nitro-aniline were slurried in 1000 parts of water; hydrochloric acid, (91 parts of 100%) and sodium nitrite (69 parts) were added in order, while the temperature was maintained between 5 and 15° C. This slurry of diazo was added to a solution of 148 parts p-chlorophenol, 46 parts caustic, and 53 parts soda ash in 1200 parts water. Coupling took place rapidly, producing a yellow-brown slurry, to which 165 parts of sodium disulfide were added. The mixture was heated at 80° C. for one hour. The solid product was isolated by salting and acidification, and used as a wet press cake for the final step, in which 45 parts Leucanol, and 10 parts glue were added to make a thin slurry, to which 300 parts of acetic anhydride were added gradually. The temperature was allowed to rise from 20 to 65° C. When the mass was completely acetylated, it was cooled, washed with water, filtered and dried.

Example II

A press cake prepared as described in Example I was slurried in 1175 parts of acetic acid. To this slurry were added 102 parts of acetic anhydride while the temperature was allowed to rise to 55° C. The acetic acid was recovered by filtration and the press cake was washed with water and dried to give the desired product.

Example III

One part of the dye prepared as in Example I or II was dispersed by suitable treatment with a dispersion agent, such as soap, to form a dye bath containing 8000 parts of water. 200 parts of nylon were entered at a temperature of 80–100° F. During twenty minutes the temperature was uniformly raised to 130–140° F., and the nylon in the bath was turned constantly to insure good contact with the dye dispersion and to obtain a level dyeing. The temperature was gradually raised to 180° and held at that point for one hour. The nylon was removed from the dye bath, rinsed thoroughly with cold water and dried. A bright, strong, level yellow dyeing was obtained. It had good fastness to light and to such treatments as washing, hot moist pressing, perspiration and dry cleaning.

Red and blue dyes of the dispersed type may be used in the same dye bath with the new yellow to produce varying shades of brown. To obtain light shades on nylon hosiery the ratio of dye to fiber should be very small.

Example IV

If 200 parts of acetate rayon were used instead of the nylon in Example III a bright, strong, level dyeing of good properties was obtained. It was greener in shade and faster to light than an equal strength acetate rayon dyeing of the azo dye p-amino-acetanilide→p-cresol.

As many apparently widely different embodiments of this invention may be made without departing from the spirit and scope thereof, it is to be understood that I do not limit myself to the specific embodiments thereof except as defined in the appended claims.

I claim:

1. The process of preparing a dyestuff which comprises coupling diazotized para-nitro-aniline to para-chloro-phenol, reducing the product with sodium disulfide, isolating it, and acetylating it with acetic anhydride.

2. The process of preparing a dyestuff which comprises coupling para-nitro-aniline diazo to para-chloro-phenol, and reducing and acetylating the product.

NICHOLAS J. LETANG.